(12) United States Patent
Tong

(10) Patent No.: US 12,532,960 B1
(45) Date of Patent: Jan. 27, 2026

(54) RECIPROCATING BARBECUE GRILL ELECTRIC CLEANING BRUSH

(71) Applicant: Banghua Tong, Shangqiu (CN)

(72) Inventor: Banghua Tong, Shangqiu (CN)

(*) Notice: Subject to any disclaimer, the term of this patent is extended or adjusted under 35 U.S.C. 154(b) by 0 days.

(21) Appl. No.: 19/335,041

(22) Filed: Sep. 22, 2025

(30) Foreign Application Priority Data

Sep. 12, 2025 (CN) .......................... 202521978199.5

(51) Int. Cl.
| | |
|---|---|
| *A47J 37/07* | (2006.01) |
| *A46B 5/00* | (2006.01) |
| *A46B 13/02* | (2006.01) |
| *A46B 15/00* | (2006.01) |

(52) U.S. Cl.
CPC ............ *A46B 13/02* (2013.01); *A46B 5/0008* (2013.01); *A46B 15/0051* (2013.01); *A46B 15/0081* (2013.01); *A47J 37/07* (2013.01)

(58) Field of Classification Search
CPC ... A46B 7/04; B25G 1/10; A47J 37/07; A47L 13/08
See application file for complete search history.

(56) References Cited

U.S. PATENT DOCUMENTS

| | | | | | |
|---|---|---|---|---|---|
| 3,685,080 | A | * | 8/1972 | Hubner | A61C 17/3481 |
| | | | | | 200/538 |
| 4,122,983 | A | * | 10/1978 | Jolly | A46B 11/0027 |
| | | | | | 401/175 |
| 6,434,773 | B1 | * | 8/2002 | Kuo | A61C 17/227 |
| | | | | | 15/28 |
| 9,161,612 | B2 | * | 10/2015 | Woods | A47L 11/282 |
| 2004/0019991 | A1 | * | 2/2004 | Neal | A47L 13/12 |
| | | | | | 15/176.4 |
| 2016/0066761 | A1 | * | 3/2016 | Magnani | A47L 13/022 |
| | | | | | 30/172 |
| 2019/0142147 | A1 | * | 5/2019 | Quinn | A46B 11/066 |
| | | | | | 4/606 |
| 2022/0167587 | A1 | * | 6/2022 | Mogren | A01K 13/003 |
| 2022/0218096 | A1 | * | 7/2022 | Magnani | A46B 5/02 |

FOREIGN PATENT DOCUMENTS

| | | | | | |
|---|---|---|---|---|---|
| CN | 221844133 | U | * | 10/2024 | |
| WO | WO-2006019289 | A1 | * | 2/2006 | ............ A46B 13/04 |
| WO | WO-2023158585 | A1 | * | 8/2023 | ............ A47L 13/34 |

* cited by examiner

*Primary Examiner* — Michael D Jennings
(74) *Attorney, Agent, or Firm* — JEEN IP LAW, LLC

(57) ABSTRACT

A reciprocating barbecue grill electric cleaning brush is provided. Which includes a main engine and a reciprocating cleaning mechanism. An inner side of the main engine is provided with a driving device, and the driving device has an output end; the reciprocating cleaning mechanism is detachably provided on one side of the main engine. An input end of the reciprocating cleaning mechanism is connected to the output end of the driving device to control a brush head located at a bottom of the reciprocating cleaning mechanism to make high-speed reciprocating motion parallel to a surface of the barbecue grill. This electric brush can efficiently clean corners and crevices by transforming the motor rotation form into a back-and-forth brushing form that simulates manual brushing. This electric brush includes a splash guard and uses auxiliary wheels to assist in movement and press the frame, thereby greatly improving brushing efficiency.

11 Claims, 16 Drawing Sheets

RECIPROCATING BARBECUE GRILL ELECTRIC CLEANING BRUSH

CROSS-REFERENCE TO RELATED APPLICATIONS

This application claims priority to Chinese Patent Application No. 202521978199. 5, filed on Sep. 12, 2025, which is hereby incorporated by reference in its entirety.

TECHNICAL FIELD

The present disclosure relates to the field of electric cleaning brush technologies, and in particular, to a reciprocating barbecue grill electric cleaning brush.

BACKGROUND

Barbecue is a process of placing ingredients on a grill to grill. Whether it's street side or family style barbecue, people are fond of using barbecue grills combined with charcoal fire to maximize the flavor of the ingredients.

However, for this type of charcoal barbecue, the most troublesome thing is to clean the food residue on the grill, which is reflected in two application scenarios. The first is that during the barbecue process, after grilling, the previous food residue is prone to stick to the grill, thereby affecting subsequent grilling. The second is that after grilling, the entire grill needs to be thoroughly cleaned.

Taking the first type of barbecue process with high difficulty in cleaning as an example, cleaning the grill is mainly due to the food residue on the grill. Secondly, the grill is mostly square and faces high temperatures. If manual cleaning is used, it is time-consuming, laborious, and prone to burns. Therefore, there are several electric barbecue cleaning brush products on the market. These products mostly adopt the design scheme of electric drum type steel wire brushes, which usually consists of one or more high-speed rotating drum brush heads. The drum surface is provided with metal wires or hard bristles. Users can use handheld devices to push the rotating brush drum back and forth on the surface of the barbecue rack and use rotational friction to remove dirt. However, this type of drum-type design also has the following obvious defects.

The first issue is low cleaning efficiency and cumbersome operation: due to its cleaning method of "line" or "point" contact (relying on the tangent contact surface of the drum), the user needs to manually push back and forth multiple times to clean the entire mesh, resulting in a small coverage area and inability to clean the edges and corners properly. The cleaning process is time-consuming and cannot achieve fast and efficient comprehensive cleaning.

The second safety hazard and poor user experience: firstly, during or shortly after the barbecue process, the barbecue rack is still in a high temperature state. Traditional electric brushes usually use metal connecting rods to directly connect the brush head and motor handle. The high temperature will be quickly transmitted to the handle through the metal parts, which causes the users' hands to feel hot and even at risk of burns, forcing the user to wait for the rack to cool down or wear insulated gloves for operation, which is extremely inconvenient. Secondly, such high-speed rotating brush heads are prone to throwing out high-temperature residues with centrifugal force, which can easily splash onto people and cause burns.

The third issue is the instability of the grill during the cleaning process. This type of electric brush relies on manually applying pressure to the brush head to quickly rotate and clean the residue. Therefore, there is a tendency for the brush head to shake with the grill, leading to instability. Considering the high temperature of the grill, it is not advisable to use the other hand to hold it. If additional tools are used to hold the grill, it will inevitably increase the workload.

Therefore, there is an urgent need for a new type of electric barbecue cleaning brush that can overcome the shortcomings of existing technologies and achieve efficient, safe, labor-saving, and cleaning of barbecue grilles.

SUMMARY

In order to overcome the shortcomings of existing technology, the purpose of the present disclosure is to provide a reciprocating barbecue grill electric cleaning brush to solve the technical problems mentioned in the background technology.

To solve the technical problem, the present disclosure adopts the following technical solution for implementation.

A reciprocating barbecue grill electric cleaning brush, including:
  a main engine, where a driving device is provided on an inner side of the main engine, and the driving device includes an output end;
  a reciprocating cleaning mechanism, which is detachably provided on one side of the main engine, an input end of the reciprocating cleaning mechanism is connected to an output end of the driving device to control a brush head provided at a bottom of the reciprocating cleaning mechanism to perform high-speed reciprocating motion parallel to a surface of the barbecue grill.

In some embodiments of the present disclosure, the reciprocating cleaning mechanism includes a cover, an eccentric wheel, a guide rail, and a driving plate; an inner side of the cover is provided with a guide rail, and the driving plate is in sliding limit cooperation with the guide rail; the eccentric wheel is provided at an upper end of the driving plate, and the driving plate is provided with a reciprocating slot; the eccentric wheel has a first connection end and a second connection end, a lower end of the second connection end is connected to a bearing through a rotating shaft, and the bearing is provided in the reciprocating slot, a bottom of the driving plate is detachably connected to the brush head.

In some embodiments of the present disclosure, the guide rail includes a first guide rail and a second guide rail, and the driving plate is provided with a first sliding port and a second sliding port corresponding to positions of the first guide rail and the second guide rail; the first sliding port is passed through the first guide rail, and the second sliding port is passed through the second guide rail; the first guide rail and the second guide rail are symmetrically arranged inside the cover.

In some embodiments of the present disclosure, the cover includes a base and a shell cover, the first guide rail and the second guide rail are fixedly arranged on the base, and an avoidance groove is provided on the base; a bottom of the driving plate is provided with an insertion block, and the insertion block passes downward through the avoidance groove, and the brush head is provided with an insertion slot corresponding to a position of the insertion block.

In some embodiments of the present disclosure, the brush head includes at least one main body and an action part, the insertion slot is provided on the main body, and the action part is provided on the main body.

In some embodiments of the present disclosure, the action part is one of a mesh cleaning net, a cleaning cloth, or a steel wire ball, where the mesh cleaning net has diamond shaped mesh holes.

In some embodiments of the present disclosure, one side of the cover is provided with a rolling mechanism, and the rolling mechanism includes a rolling seat and a rolling wheel, where the rolling seat extends outward or downward from one side of the cover, and the rolling wheel is rotatably provided on one side of the rolling seat, and a bottom end of the rolling wheel is flushed with a bottom end of the brush head.

In some embodiments of the present disclosure, one side of the cover is further provided with a detachable scraper, and a bottom end of the scraper is flushed with the bottom end of the brush head.

In some embodiments of the present disclosure, one side of the cover is provided with an insertion seam, and an inner side of the insertion seam is provided with a flange; the scraper includes a fixing part and a scraper part, where there is an obtuse angle between the fixing part and the scraper part, and one side of the fixing part is provided with a notch that fits with the flange and a blind end, and the blind end is in contact with a limit block inside the cover.

In some embodiments of the present disclosure, an upper end of the main engine is further provided with a blowing mechanism, and the blowing mechanism includes a blowing motor, a fan, and an air duct; the fan is connected to an output end of the blowing motor, and the blowing motor and fan are sequentially arranged at the upper end of the main engine; the air duct includes an air outlet and an air inlet, and a top of the main engine is provided with the air outlet; one side of the main engine is provided with the air inlet, and the air inlet and the air outlet are communicated to each other.

In some embodiments of the present disclosure, one side of the main engine is provided with a handle, the air inlet is provided at a bottom of the handle; and a switch, a control board, and a battery are further provided inside the handle.

In some embodiments of the present disclosure, the reciprocating slot is a track circular structure, and reciprocating slot includes a rectangular area, a first arc-shaped bend, and a second arc-shaped bend, where the first arc-shaped bend and the second arc-shaped bend are provided on two sides of the rectangular area, and an outer circumferential arc surface of the bearing is inscribed with arc surfaces of the first arc-shaped bend and the second arc-shaped bend.

Compared to existing technologies, the beneficial effects of the present disclosure are as follows.

The present disclosure has the following beneficial effects compared to traditional cleaning brushes.

(1) Compared to traditional electric brushes, this electric brush can efficiently clean corners and crevices by transforming the motor rotation form into a back-and-forth brushing form that simulates manual brushing.

(2) This electric brush has a splash guard, thereby preventing droplets from splashing onto people.

(3) This electric brush uses auxiliary wheels to assist in movement and press the frame. The frame does not shake during the brushing process and can smoothly brush the entire frame without lifting it up after brushing one area, thereby greatly improving brushing efficiency.

(4) This electric brush is provided with a scraper that can remove large stains during the brushing process.

Provided with anti-scalding and anti-smoke functions, the device is provided with a blowing and cooling mechanism, which can assist in heat dissipation and blow away smoke during the cleaning process; by separating the handle from the brush head, heat transfer from the brush head to the handle can be prevented, thereby achieving an anti-scalding effect.

Figure 1:
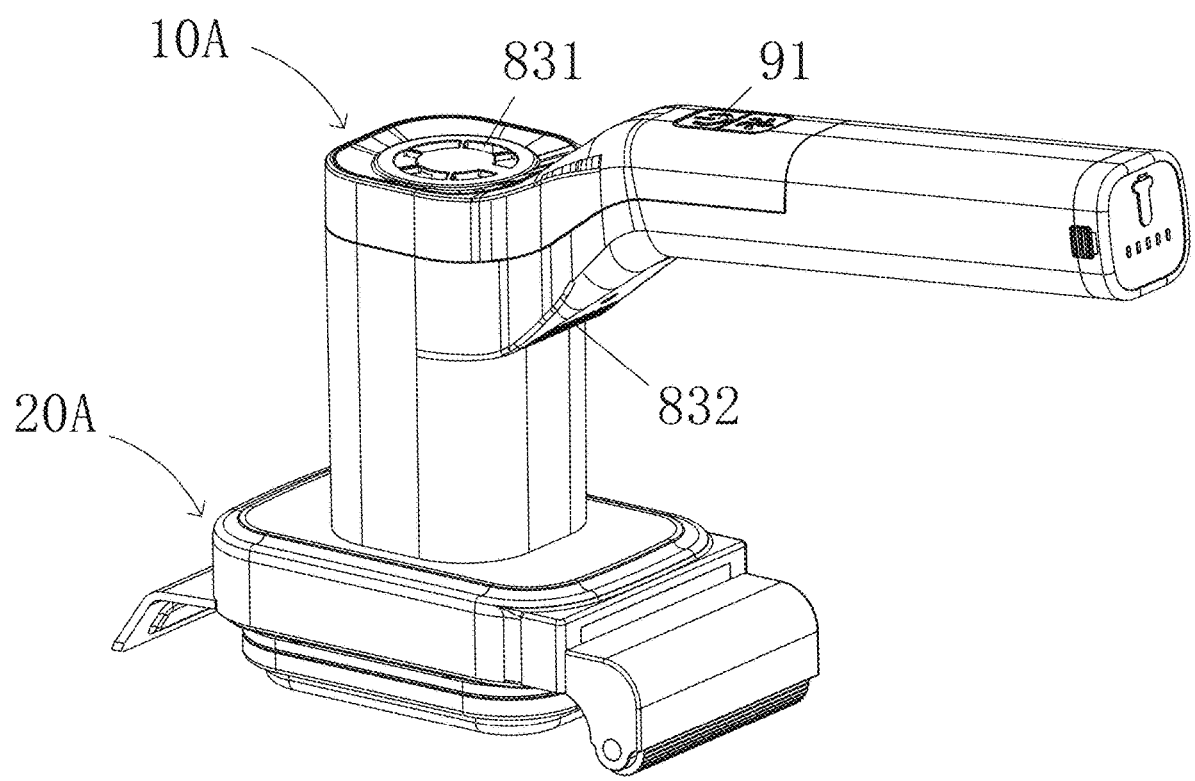
FIG. 1 is a first schematic diagram of an overall structure of the present disclosure patent from a perspective view.

Numeral reference: main engine 10A, driving device 1a, output end 101, inner chamber 102, reciprocating cleaning mechanism 20A, input end 201, cover 1, eccentric wheel 2, guide rail 3, driving plate 4, reciprocating slot 41, first connection end 21, second connection end 22, bearing 10, first guide rail 31, second guide rail 32, first sliding port 401, second sliding port 402, base 11, shell cover 12, avoidance slot 11a, insertion block 42, brush head 5, insertion slot 501, main body 51, action part 52, rolling mechanism 6, rolling seat 61, rolling wheel 62, scraper 7, insertion seam 701, flange 702, fixing part 71, scraper part 72, notch 711, blind end 712, limit block 703, blowing mechanism 8, blowing motor 81, fan 82, air duct 83, air outlet 831, air inlet 832, handle 9, switch 91, control board 92, battery 93, rectangular area 411, first arc-shaped bend 412, second arc-shaped bend 413, inner rotating shaft 621.

DESCRIPTION OF EMBODIMENTS

Below, combined with the accompanying drawings and specific embodiments, the present disclosure will be further described. It should be noted that, without conflicting, various embodiments or technical features described below can be combined arbitrarily to form new embodiments. Refer to FIGS. 1 to 16.

Figure 4:
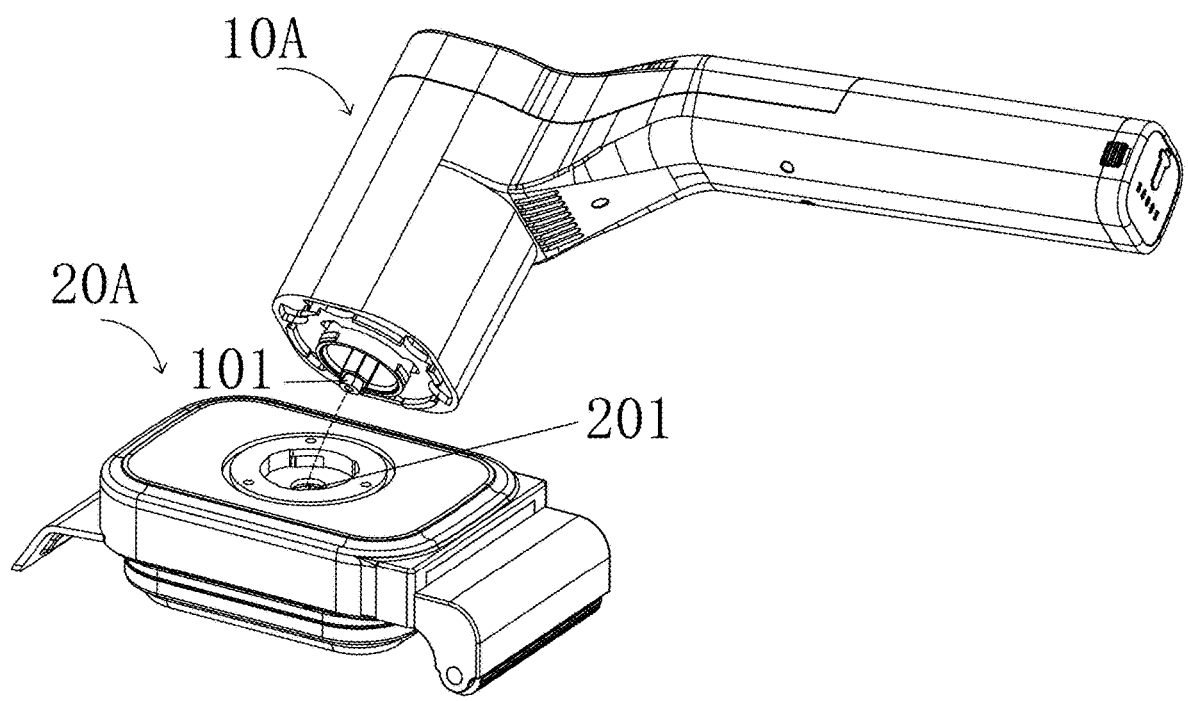
FIG. 4 is an exploded view of a main engine and a reciprocating cleaning mechanism in the present disclosure.
Figure 5:
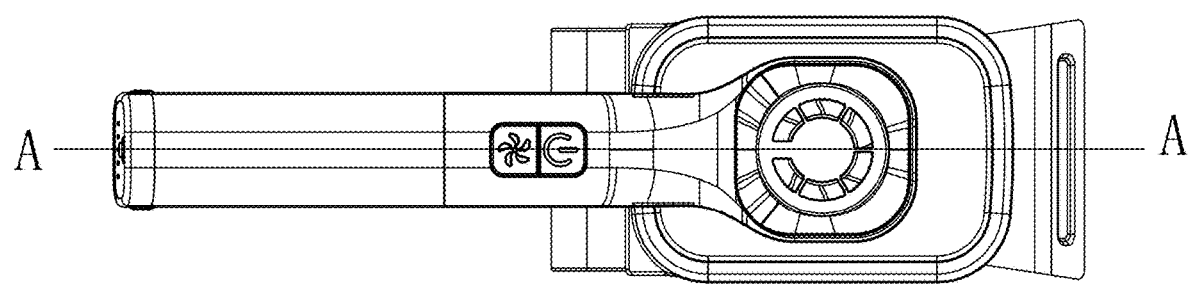
FIG. 5 is a fourth schematic diagram of the overall structure of the present disclosure in a top view.

Referring to FIGS. 1-8, this embodiment discloses a reciprocating barbecue grill electric cleaning brush, including a main engine 10A and a reciprocating cleaning mechanism 20A. An inner side of the main engine 10A is provided with an inner chamber 102 configured to install machine components, and the inner chamber 102 of the main engine 10A is provided with a driving device 1a. The driving device 1a has an output end 101, in an implementation mode, the driving device 1a is a motor. In order to control speed of a motor, a reducer or planetary gear set can be installed for the motor. The reciprocating cleaning mechanism 20A is detachably provided on one side of the main engine 10A. Referring to FIG. 4, the output end 101 of the driving device 1a is provided with an outer hexagonal insertion block, and the input end 201 of the reciprocating cleaning mechanism 20A is an inner hexagonal insertion slot that cooperates with the outer hexagonal insertion block. Therefore, the input end 201 of the reciprocating cleaning mechanism 20A is connected to the output end 101 of the driving device 1a to control a brush head 5 located at a bottom of the reciprocating cleaning mechanism 20A to perform high-speed reciprocating motion parallel to a surface of the grill. In an implementation mode, the traditional method of inserting a handle on one side of the main engine 10A can be served as an example. In this embodiment, the main engine 10A can exist separately, with only a reserved interface for inserting the handle. The insertion form can be such as a buckle, or a handle (handle 9) can be directly provided on one side of the main engine 10A, which will be more convenient to use.

Referring to FIGS. 4-8, in an implementation mode, the reciprocating cleaning mechanism 20A includes a cover 1, an eccentric wheel 2, a guide rail 3, and a driving plate 4. An inner side of the cover 1 is provided with a guide rail 3, and the driving plate 4 is in sliding limit cooperation with the guide rail 3. In an implementation mode, the driving plate 4 can perform sliding action relative to the guide rail 3. The eccentric wheel 2 is located at an upper end of the driving plate 4 and a lower end of the driving device 1a. The driving plate 4 is provided with a reciprocating slot 41, and a slot opening of the reciprocating slot 41 is upward. The reciprocating slot 41 is perpendicular to the guide rail 3 and located on an inner side of the guide rail 3. The eccentric wheel 2 has a first connection end 21 and a second connection end 22, where the first connection end 21 can serve as the input end 201. The input end 201 is connected to the output end 101 of the driving device 1a. The output end 101 is an inner hexagonal insertion slot, and the output end 101 is an outer hexagonal insertion block, that is, the inner hexagonal insertion slot is located on one end of the eccentric wheel 2. Therefore, when the driving device 1a rotates, it can drive the first connection end 21 of the eccentric wheel 2 to rotate, and its first connection end 21 will rotate to drive the second connection end 22 to rotate around an axis point of the first connection end 21. In an implementation mode, the second connection end 22 is a rotating shaft provided towards the reciprocating slot 41, and one end of the rotating shaft is connected to the bearing 10, and the bearing 10 is located in the reciprocating slot 41. A bottom of the driving plate 4 is detachably connected to the brush head 5, thereby achieving the driving device 1a to drive the eccentric wheel 2 below to rotate when the driving device 1a is rotated. The second connection end 22 of the eccentric wheel 2 is rotated around the first connection end 21, thereby driving the bearing 10 to rotate. The bearing 10 is located in the reciprocating slot 41 and undergoes a rotational internal tangent action. Therefore, the rotation of the bearing 10 can drive the reciprocating slot 41 to perform reciprocating swinging action. In an implementation mode, a diameter of the bearing 10 is slightly smaller than a diameter of the reciprocating slot 41. The diameter of the bearing 10 is about one-third of the diameter of the reciprocating slot 41. This ratio can be determined according to a size of the reciprocating cleaning mechanism 20A and the power of the motor. In an implementation mode, the greater the diameter of the reciprocating slot 41, the longer of an arm of the eccentric wheel 2 acting as a swing arm, and the more kinetic energy it requires. The higher the driving power required by the motor, but a brush head 5 with a larger area can be installed, or in other words, the longer stroke of a single reciprocating motion, which is more advantageous for brushing work. On the contrary, the smaller diameter of the reciprocating slot 41, the smaller the required driving power of the motor, and the brush head 5 with smaller area that can be installed, resulting in a shorter single reciprocating motion. This can be used to customize different cleaning brushes.

Figure 7:
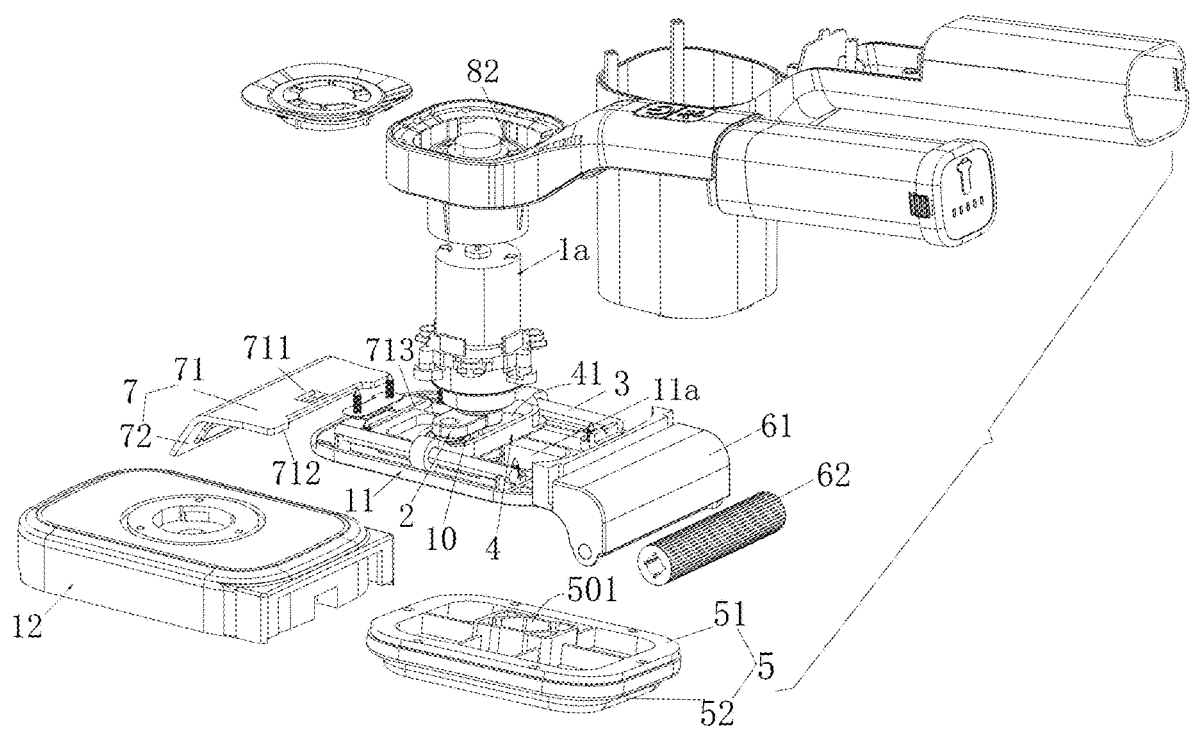
FIG. 7 is a decomposition schematic diagram of the overall structure of the present disclosure.
Figure 8:
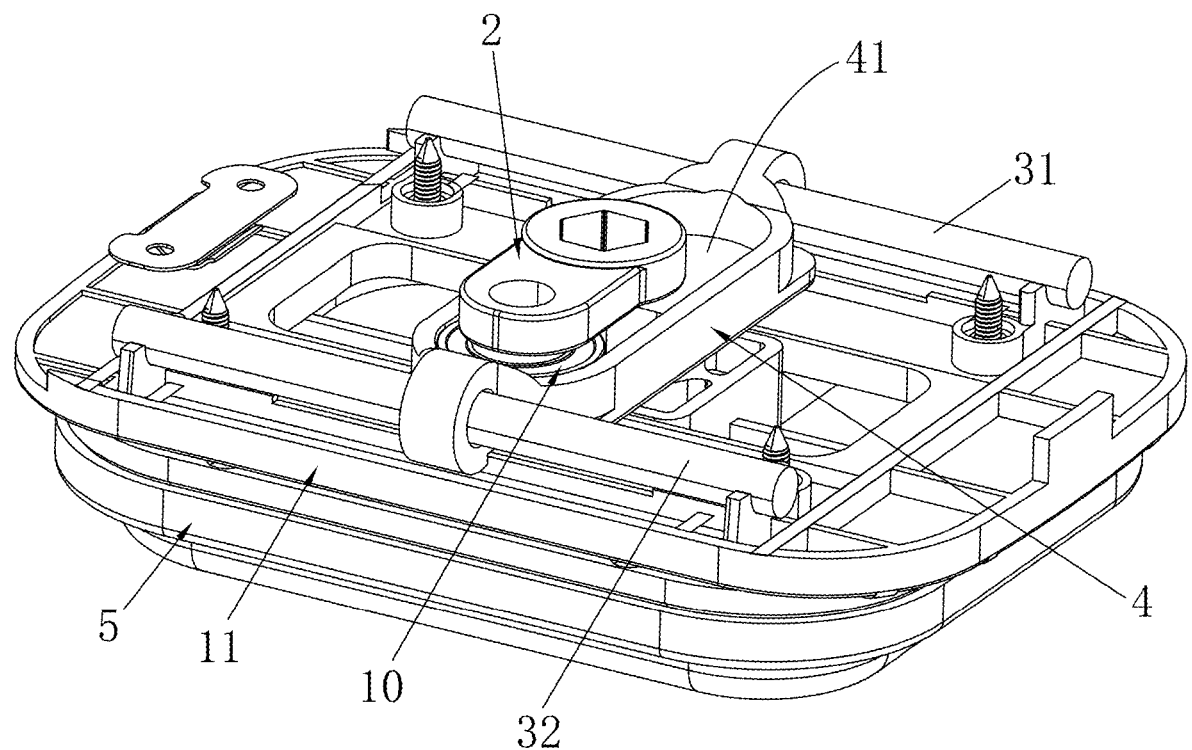
FIG. 8 is a partial structural diagram of the reciprocating cleaning mechanism in the present disclosure.
Figure 9:
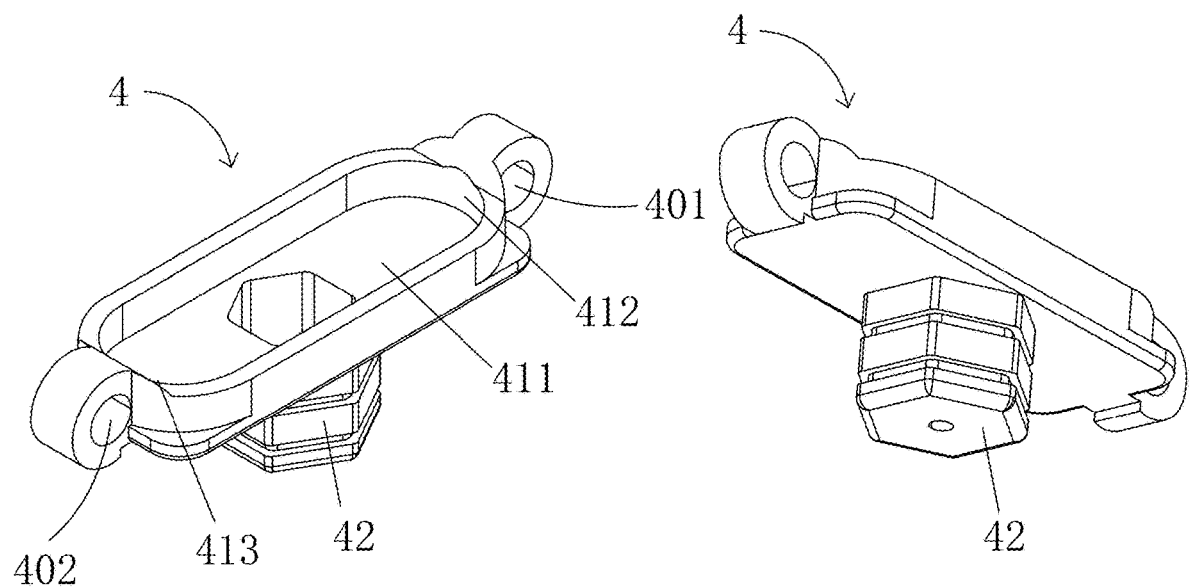
FIG. 9 is a schematic structural diagram of a driving plate in the present disclosure (left is a top perspective view and right is a bottom perspective).
Figure 10:
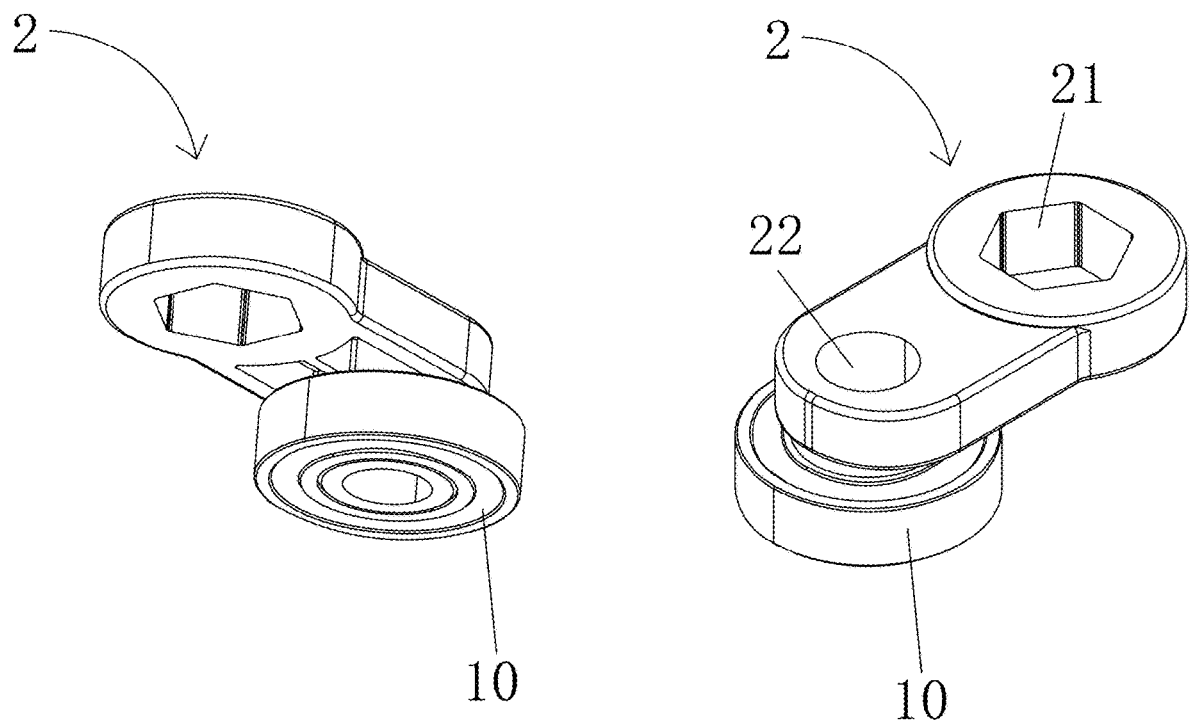
FIG. 10 is an assembly structural diagram of an eccentric wheel and a bearing in the present disclosure (left is a bottom perspective view and right is top perspective view).

In an implementation mode, referring to FIGS. 7 and 8, the guide rail 3 includes a first guide rail 31 and a second guide rail 32. The driving plate 4 is provided with a first sliding port 401 and a second sliding port 402 corresponding to positions of the first guide rail 31 and the second guide rail 32. The first sliding port 401 passes through the first guide rail 31, and the second sliding port 402 passes through the second guide rail 32. The first guide rail 31 and the second guide rail 32 are symmetrically arranged inside the cover 1. A cross-section of the first guide rail 31 is the same as a perforation shape of the first sliding port 401, and smooth sliding can be achieved with lubricating oil in daily use.

Referring to FIGS. 7 and 8, in an implementation mode, the cover 1 includes a base 11 and a shell cover 12. The first guide rail 31 and the second guide rail 32 are fixedly arranged on the base 11, presenting a middled suspended structure fixed by two ends. The base 11 is provided with an avoidance slot 11a, and the bottom of the driving plate 4 is provided with an insertion block 42, and the insertion block 42 passes downward through the avoidance slot 11a. The brush head 5 is provided with an insertion slot 501 corresponding to a position of the insertion block 42, and the avoidance slot 11a is configured for a reciprocating movement of the insertion block 42.

Figure 13:
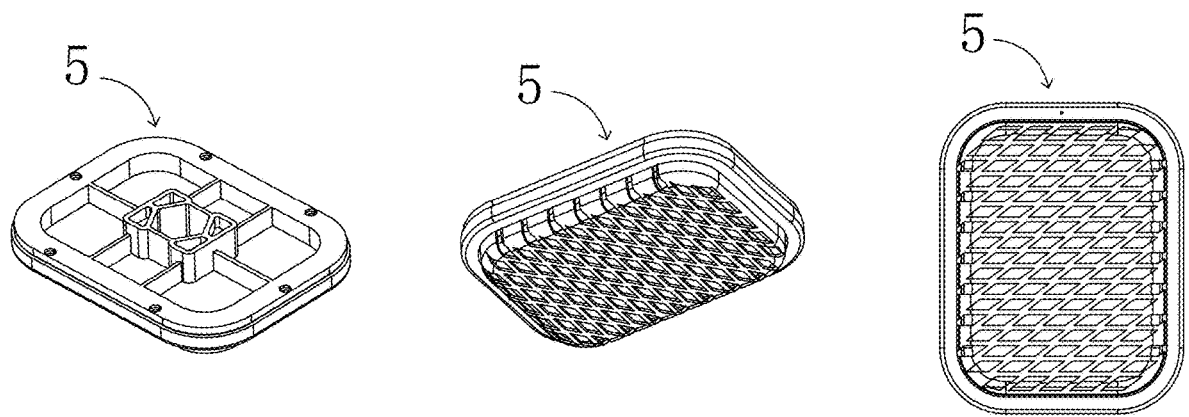
FIG. 13 is a third schematic structural diagram of the brush head in an embodiment.
Figure 14:
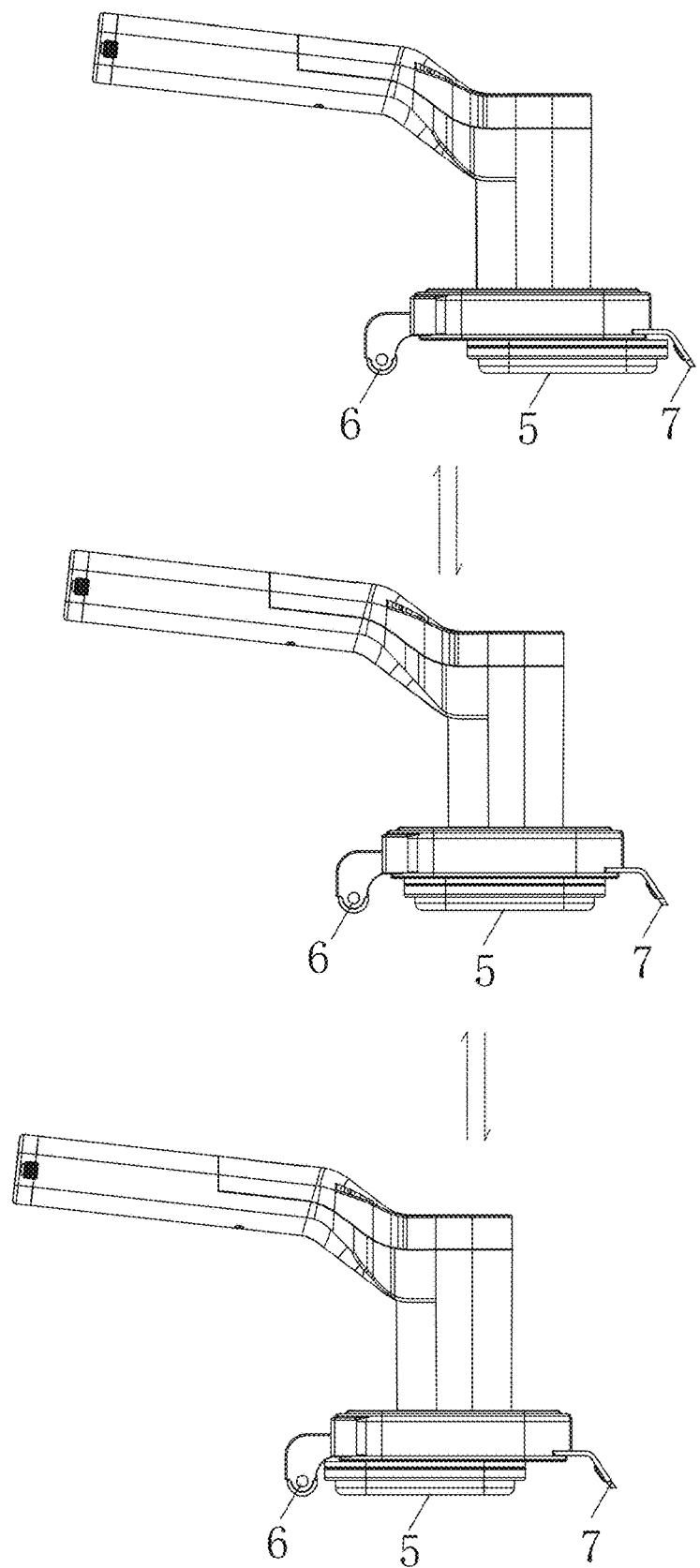
FIG. 14 is a schematic diagram of a reciprocating motion of the brush head in the reciprocating cleaning brush of the present disclosure (overall structural diagram).

Referring to FIG. 7, in an implementation mode, there are various forms of food residue on the barbecue grill. Traditional brush heads 5 often use a rotating friction method to brush away the residue. For large and sticky residues, this cleaning effect is not satisfactory. In this application, the brush head 5 includes at least one main body 51 and one action part 52. The insertion slot 501 is provided on the main body 51, and the action part 52 is provided on the main body 51. The action part 52 is one of a mesh cleaning mesh, a cleaning cloth or a steel wire ball. Referring to FIG. 13, the mesh cleaning mesh has diamond shaped mesh holes, but rectangular mesh holes with angles can also be referred to. In an implementation mode, grid material of the mesh cleaning mesh is made of flat material, combined with the reciprocating cleaning mechanism of 20A. The reciprocating brush head 5 creates a cleaning effect like a blade, which can clean large and sticky residues in one go. It should be explained that the action part 52 here can be installed in a wrapped manner at the bottom of the main body 51, and the installation structure can adopt a traditional installation structure.

Figure 11:
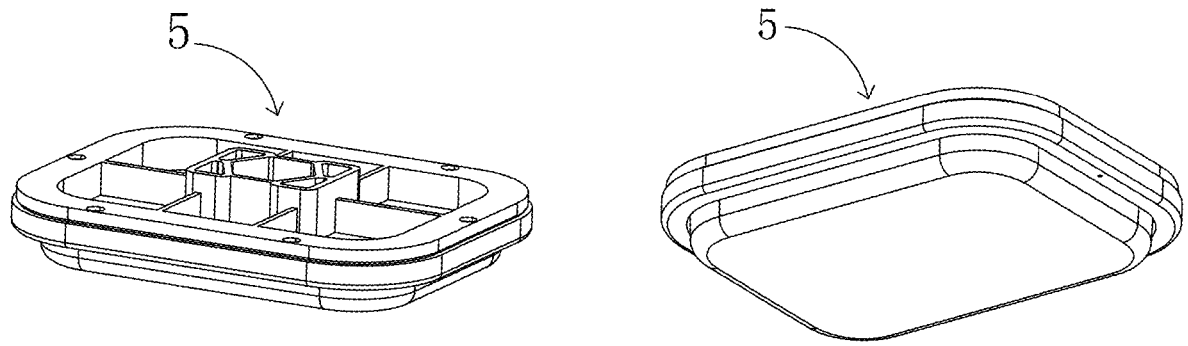
FIG. 11 is a first schematic structural diagram of a brush head in an embodiment.
Figure 12:
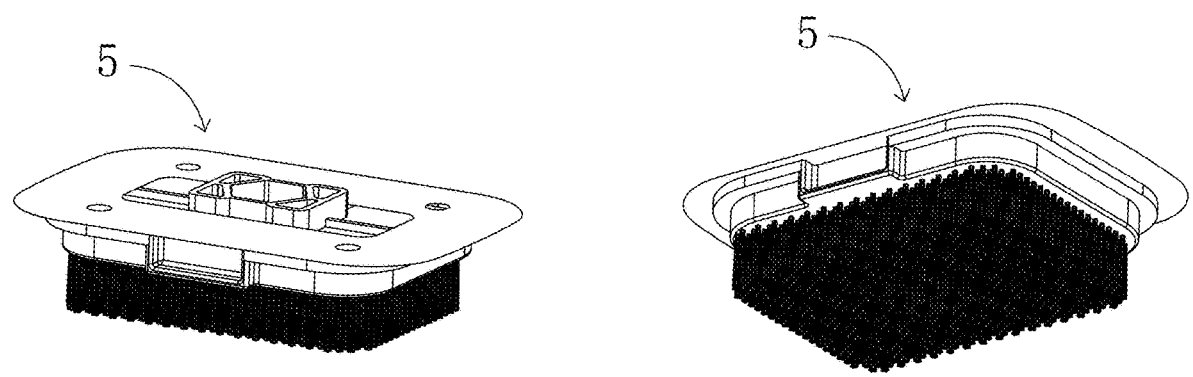
FIG. 12 is a second schematic structural diagram of the brush head in an embodiment.

Referring to FIGS. 11-13, it should be noted that the reciprocating cleaning mechanism 20A adopts a simulated manual back and forth brushing reciprocating cleaning method, which is different from the traditional rotation cleaning electric brush. The form of the brush head 5 is not limited to a single type. When used for cleaning during the barbecue process, a mesh style cleaning net (brush head 5) can be used for better cleaning effect. When applied for comprehensive cleaning of the barbecue grill after barbecue, the traditional rotation cleaning electric brush is prone to throwing water out and splashing onto people due to centrifugal force. On the other hand, its line contact or point contact method is difficult to clean the stains inside or at the bottom of the barbecue grill. However, this cleaning brush is replaced after installing the brush, due to the use of the reciprocating cleaning mechanism 20A, simulating the manual brushing method, the bristles of the brush can be embedded into the bottom of the barbecue grill or the interior of the barbecue grid, resulting in better cleaning effect. Moreover, due to the rectangular shape of the reciprocating cleaning mechanism 20A, it can clean the corners of most barbecue grills, and traditional electric cleaning brushes, due to their rotating form, have a circular action that is difficult to clean the corners of rectangular barbecue grills.

Figure 2:
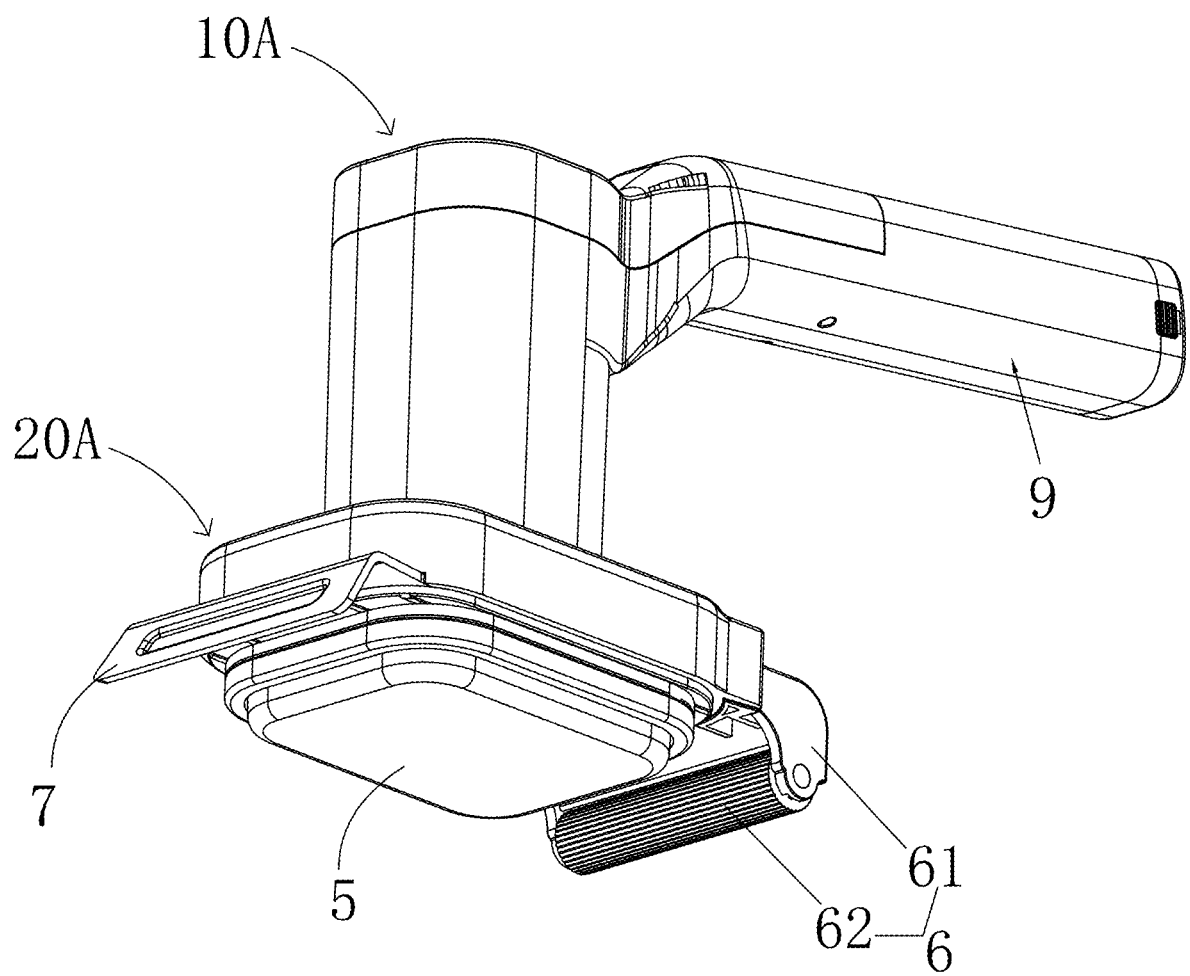
FIG. 2 is a second schematic diagram of the overall structure of the present disclosure patent from the perspective view.
Figure 3:
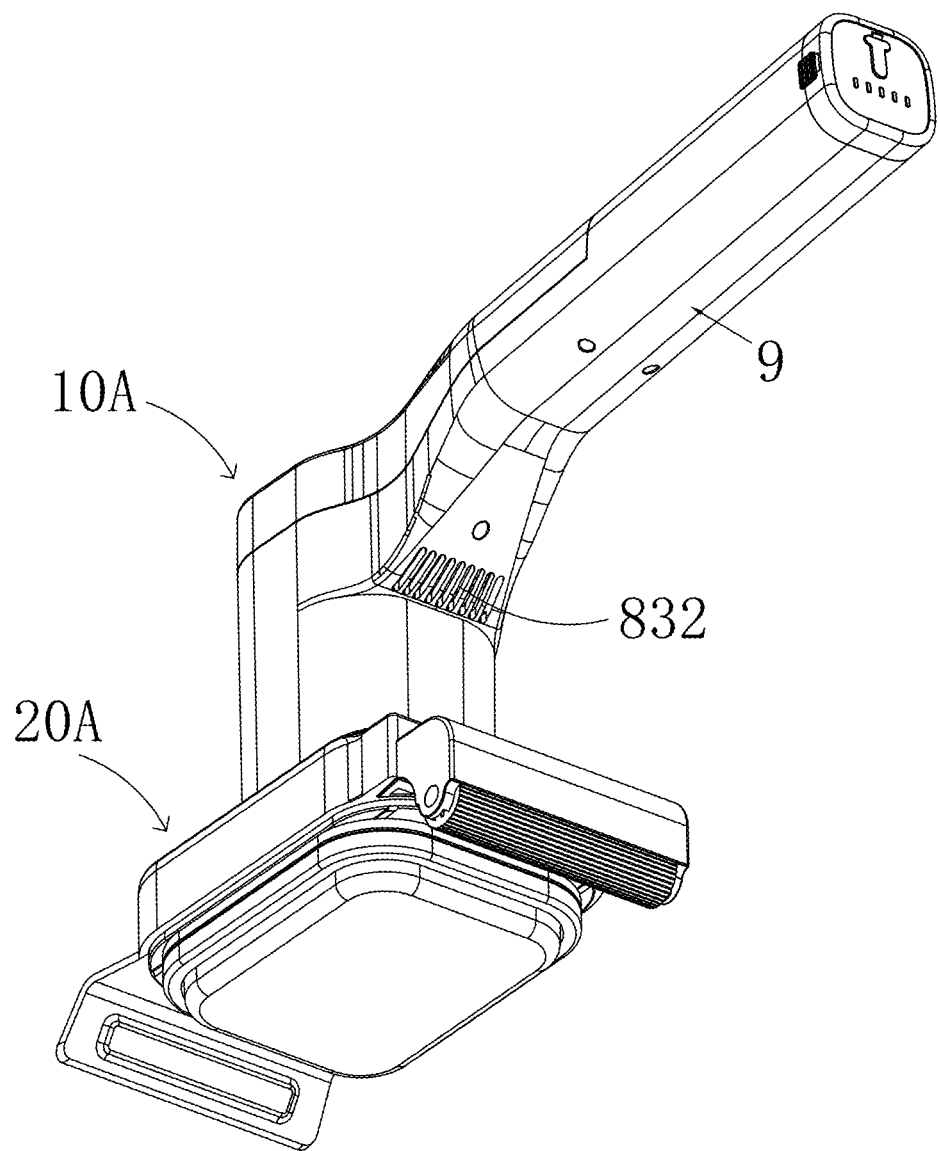
FIG. 3 is a third schematic diagram of the overall structure of the present disclosure from the perspective view.

Referring to FIGS. 2 and 7, in an implementation mode, the traditional rotation electric brush is prone to shaking the barbecue grill due to centrifugal friction during cleaning or brushing, and the brush head 5 is prone to drift over the surface of the grill, causing useless cleaning actions. In addition, the problem of high temperature of the grill during the grilling process and the reluctance to press it with hands is addressed. In this application, a rolling mechanism 6 is provided on one side of the cover 1, and the rolling mechanism 6 includes a rolling seat 61 and a rolling wheel 62. The rolling seat 61 extends outward or downward from one side of the cover 1, and the rolling wheel 62 is rotatably provided on one side of the rolling seat 61. A bottom end of the rolling wheel 62 is approximately flushed with a bottom end of the brush head 5. In an implementation mode, an inner side of the rolling seat 61 has an inner rotating shaft, through which the rolling wheel 62 is passed, allowing the rolling wheel 62 to rotate, in order to adapt to high-temperature barbecue grills, the rolling wheel 62 is made of high-temperature resistant materials such as stainless steel, high-temperature resistant silicone, etc. Of course, the anti-slip problem when greasy on the barbecue grills should also be considered. An outer surface of the rolling wheel 62 is provided with anti-slip grooves or wave grooves as shown in the figure. Therefore, with the addition of the rolling mechanism 6, the reciprocating cleaning mechanism 20A, during a cleaning process, on the one hand, holds the handle 9 or the main engine 10A and applies a certain amount of pressing force, so that the outward swinging force between the high-speed moving brush head 5 and the barbecue grill is eliminated. On the other hand, when the rolling wheel 62 contacts with the barbecue grill, it can act as a fulcrum effect for the brush head 5, rendering the brush head 5 to be brushed more effectively. The brush head 5 can work on the barbecue grill every time it reciprocates, without wasting any effort.

Figure 16:
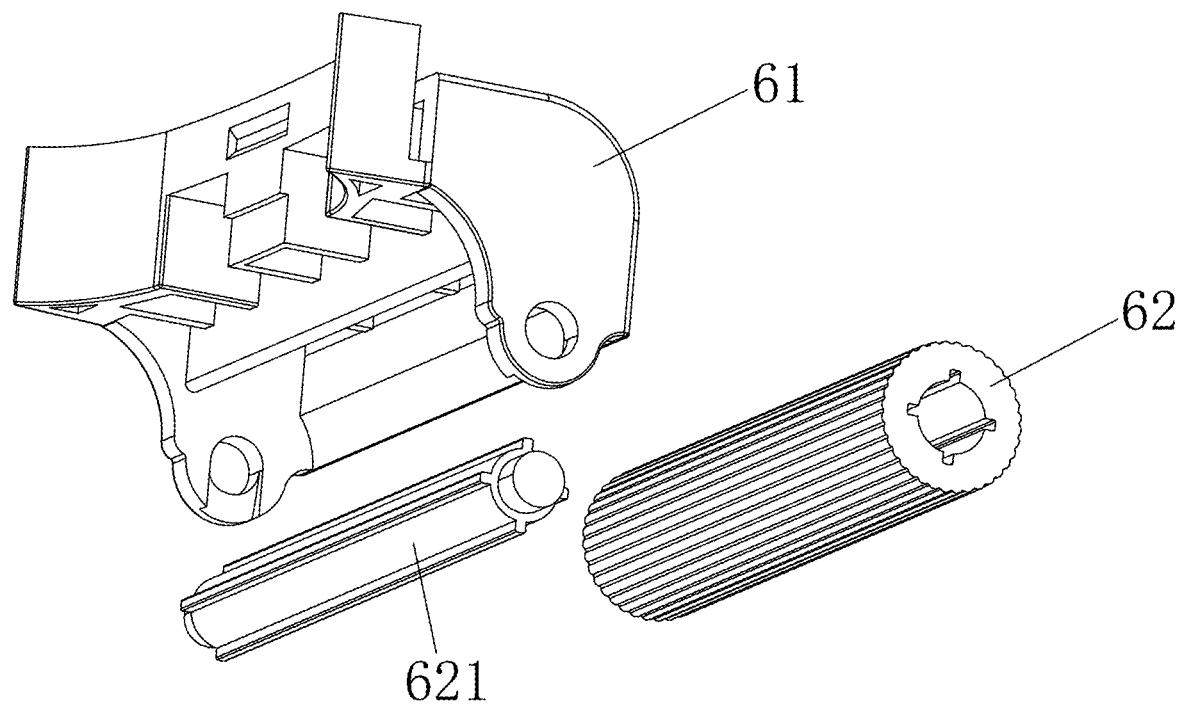
FIG. 16 is an exploded view of a rolling mechanism in the reciprocating cleaning brush of the present disclosure.

In an implementation mode, referring to FIG. 16, the rolling wheel 62 has an idle rotation property, that is, an inner rotating shaft 621 of the rolling wheel 62 is installed in a fitting form with the rolling wheel 62. The fitting installation form can be a protrusion that is provided on an outer side of the inner rotating shaft 621, and a recess is provided inside the rolling wheel 62. The protrusion cooperates with the recess, thereby preventing the rolling wheel 62 from rotating relative to the inner rotating shaft 621. Two ends of the inner rotating shaft 621 are rotatably connected to the rolling seat 61. In this way, during a brushing process, when encountering some parts that are too greasy and easy to slip, the rolling wheel 62 can also move normally due to its idle rotation feature.

Referring to FIG. 7, in an implementation mode, for large and highly viscous residues, it is relatively difficult to brush them solely with the brush head 5. The traditional approach is to first use an additional scraper 7 to scrape once, which can be very troublesome. In the present application, one side of the cover 1 can also be provided with a detachable scraper 7, and a bottom end of the scraper 7 is roughly flushed with the bottom end of the brush head 5. A blade surface of the scraper 7 can be a blade with a cutting edge, and the scraper 7 is directly integrated into the reciprocating cleaning mechanism 20A. In this way, when using, hold the handle 9 and place the device on the barbecue grill, naturally pushing it forward. As the scraper 7 is located in front of a moving direction, large pieces of residue are scraped off first. Of course, this requires making the blade of the scraper 7 parallel to the surface of the barbecue grill, and then the brush head 5 can brush off small pieces of residue and stains, which can achieve efficient cleaning. In an implementation mode, in order to facilitate the installation and disassembly of the scraper 7, one side of the cover 1 is provided with an insertion seam 701, and an inner side of the insertion seam 701 is provided with a flange 702, and the flange 702 has a certain degree of elasticity. The scraper 7 includes a fixing part 71 for installing and fixing on the cover 1, and a scraper part 72 extending downward to roughly flush with the brush head 5. There is an obtuse angle between the fixing part 71 and the scraper part 72. One side of the fixing part 71 is provided with a notch 711 that fits with the flange 702, and a blind end 712; where the blind end 712 is in contact with the limit block 703 inside the cover 1. Here, the notch 711 is designed as a notch with a curved surface. The notch 711 can be engaged with the flange 702. When installation is required, simply insert one end of the fixing part 71 of the scraper 7 towards the insertion seam 701, and then hear the sound of successful engagement, the notch 711 of the fixing part 71 is just successfully engaged with the elastic flange 702, and the blind end 712 of the fixing part 71 is just in contact with the limit block 703 inside the cover 1. This limit block 703 provides support during the process of the scraper 7 shoveling the residue forward. When it is necessary to pull out the scraper 7, it only needs to be pulled out with force. At this time, the elastic flange 702 contracts inward under force, and then the notch 711 and the flange 702 are disengaged from the engagement, so that the scraper 7 can be pulled out. In an implementation mode, the flange 702 is made of a bent metal sheet, which can form a downward curved surface.

Figure 6:
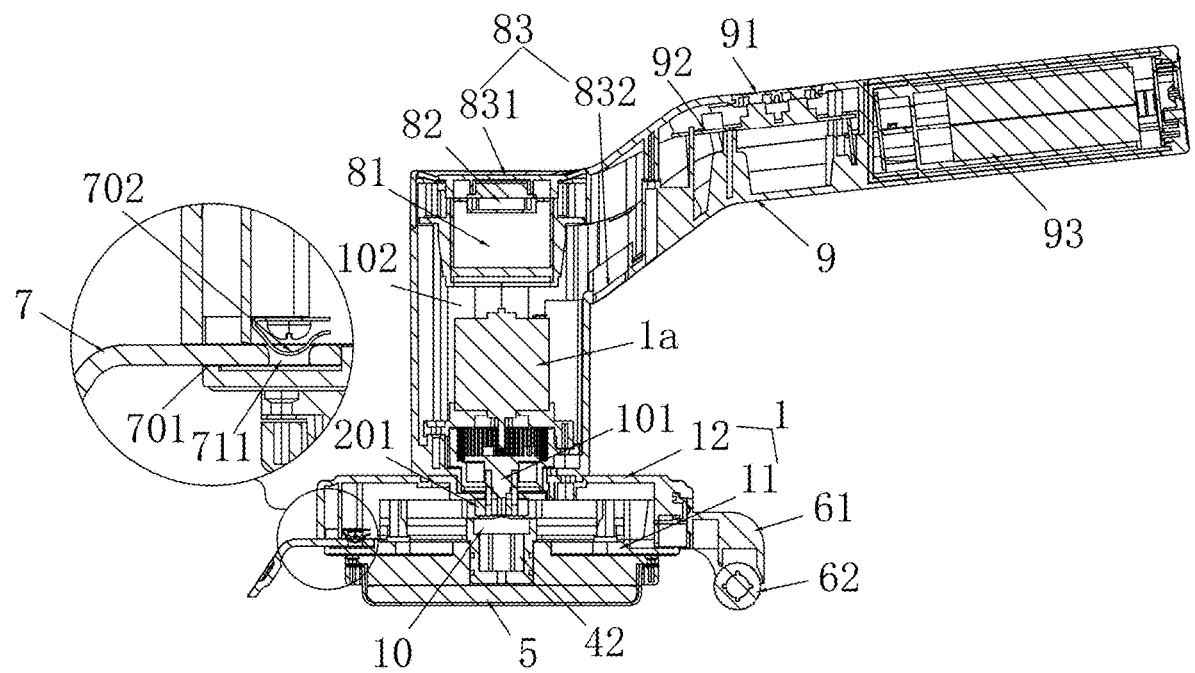
FIG. 6 is a A-A cross-sectional view in FIG. 5.

Referring to FIGS. 1 and 6, in an implementation mode, in the application scenarios where blowing is required during the barbecue process, one is when starting a fire, another is the smoke generated by the charcoal fire during the grilling process, and the other is the smoke generated by the residue falling into the charcoal fire during the grilling process. Conventional barbecue devices require a separate blower for starting a fire, and a blower for daily oil fume blowing, which is very troublesome. The upper end of the main engine 10A is further provided with a blowing mechanism 8, and the blowing mechanism 8 includes a blowing motor 81, a fan 82, and an air duct 83. The fan 82 is connected to an output end 101 of the motor, and the blowing motor 81 and the fan 82 are arranged in sequence from bottom to top at the upper end of the inner chamber 102 of the main engine 10A. The air duct 83 includes an air outlet 831 and an air inlet 832. A top of the main engine 10A is provided with the air outlet 831, and one side of the main engine 10A is provided with the air inlet 832. The air inlet 832 and the air outlet 831 communicated to each other. Wind passes through a cavity where the fan 82 is located from the air inlet 832 and is then blown out through the air outlet 831, thereby forming a complete air duct 83. When starting a fire, the air outlet 831 is aligned with the charcoal fire. When the oil fume needs to be blown away, the air inlet 832 is aligned with the position of the grill. During the barbecue process, when using this device to clean the residue, white smoke may occasionally fall into the charcoal fire from the residue, and at this time, the white smoke will also be quickly blown away along the air inlet 832. This is a win-win situation. In an implementation mode, the blowing motor 81 uses a DC brushless high-speed motor, and the fan 82 uses an axial flow fan.

One side of the main engine 10A is provided with a handle 9, and the air inlet 832 is provided at a bottom of the handle 9. The handle 9 further includes a switch 91, a control board 92, and a battery 93. The air inlet 832 is located on one side of the handle 9, and is connected to the cavity where the fan 82 is provided on an upper end of the main engine 10A (for ease of installation, the inner chamber 102 of the main engine 10A can be divided into two ends, with a lower section used to install the driving device and an upper end used to install the blowing mechanism 8). In an implementation mode, a direction of the air inlet 832 is diagonally downward, just above the brush head 5. This is set so that when the brush head 5 advances, the white smoke generated by the falling residue is immediately sucked away by the air inlet 832 to achieve seamless connection. Besides that, the brush head 5 of this cleaning brush is not directly connected to the handle 9, and the temperature of the brush head 5 will not be directly transmitted to the handle 9. Furthermore, a blowing mechanism 8 is provided on the upper end of the main engine 10A, and some of the heat transferred upwards can also be carried away by the blowing mechanism 8. In this way, the heat transmitted to the handle 9 is lower, which can achieve anti-scalding. To further prevent scalding, an outer shell of the handle 9 is made of high-temperature plastic material.

Figure 15:
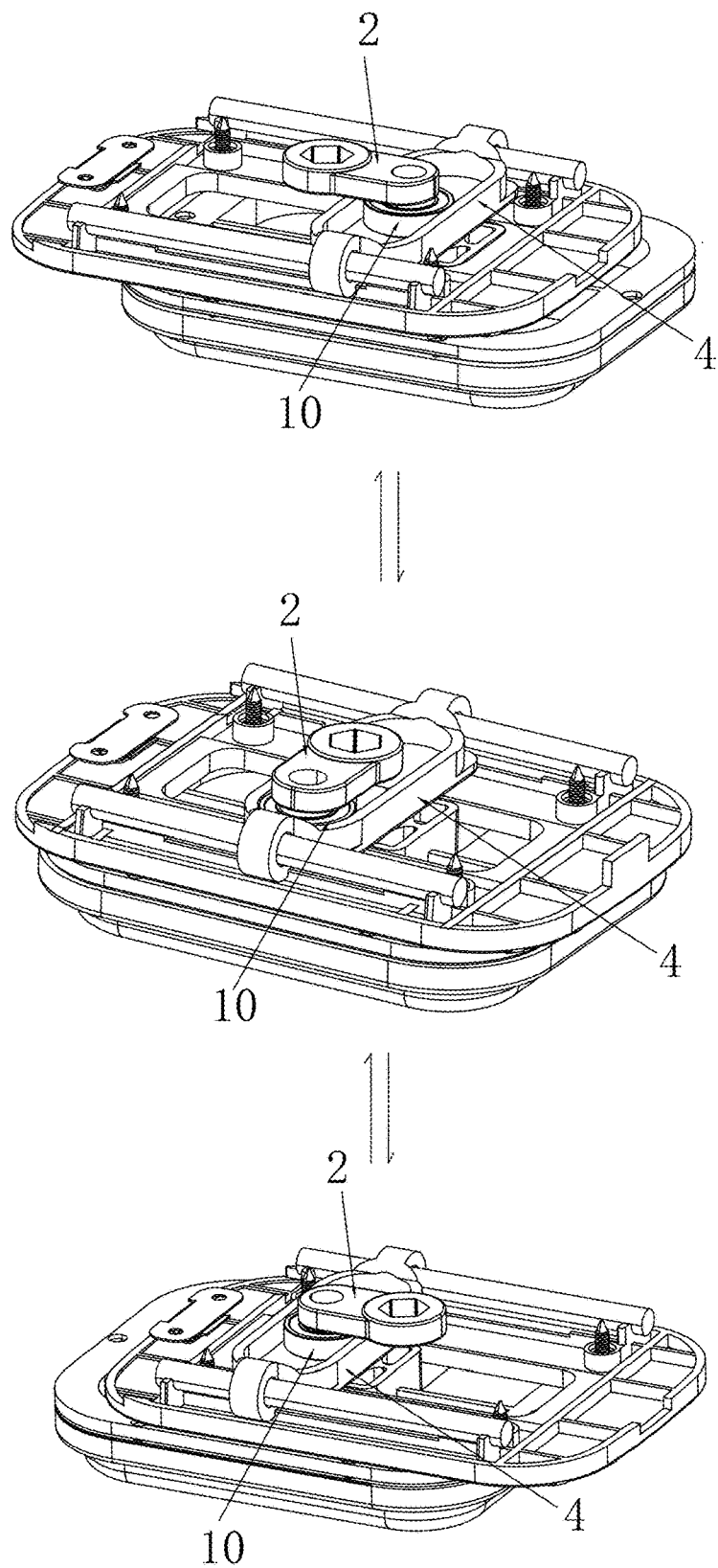
FIG. 15 is a schematic diagram of the reciprocating motion of the brush head in the reciprocating cleaning brush of the present disclosure (internal structure diagram).

In an implementation mode, the reciprocating slot 41 is a track circular structure, including a rectangular area 411, a first arc-shaped bend 412, and a second arc-shaped bend 413. The first arc-shaped bend 412 and the second arc-shaped bend 413 are respectively provided on two sides of the rectangular area 411, and an outer circumferential arc surface of the bearing 10 can just be inscribed with arc surfaces of the first arc-shaped bend 412 and the second arc-shaped bend 413. In this way, the outer circumferential of the bearing 10 and the inner surface of the reciprocating slot 41 always make internal and external tangent motion. As shown in FIG. 15, when the bearing 10 at the lower end of the eccentric wheel 2 rotates to a direction parallel to the reciprocating slot 41, the brush head 5 is in a middle position of this device. When the bearing 10 at the lower end of the eccentric wheel 2 rotates to a direction perpendicular to the reciprocating slot 41, the brush head 5 is located at an end position on left or right side, which means completing a left or right movement. When the entire movement is continued, the action mechanism of the reciprocating cleaning mechanism 20A is formed.

It should be noted that the main engine 10A and the reciprocating cleaning mechanism 20A in this reciprocating cleaning brush are detachable connections, which facilitates the replacement of different brush heads 5 for use. In a detachable connection structure between the reciprocating cleaning mechanism 20A and the main engine 10A, traditional snap rotating connection structures, magnetic suction structures, or other structures can be used for connection. An insertion hole needs to be reserved at the cover of the reciprocating cleaning mechanism 20A for the outer hexagonal insertion block protruding from the bottom of the main engine 10A to be inserted.

The above embodiments are only preferred embodiments of the present disclosure and cannot be used to limit the protection scope of the present disclosure. Any non-substantial changes and substitutions made by those skilled in the art on the basis of the present disclosure are within the protection scope of required by the present disclosure.

What is claimed is:

1. A reciprocating barbecue grill electric cleaning brush, comprising:
   a main engine, wherein a driving device is provided on an inner side of the main engine, and the driving device comprises an output end;
   a reciprocating cleaning mechanism, which is detachably provided on one side of the main engine, an input end of the reciprocating cleaning mechanism is connected to the output end of the driving device to control a brush head provided at a bottom of the reciprocating cleaning mechanism to perform high-speed reciprocating motion parallel to a surface of the barbecue grill; wherein the reciprocating cleaning mechanism comprises a cover; an eccentric wheel, a guide rail, and a driving plate;
   an inner side of the cover is provided with a guide rail, and the driving plate is in sliding limit cooperation with the guide rail;
   the eccentric wheel is provided at an upper end of the driving plate, and the driving plate is provided with a reciprocating slot;
   the eccentric wheel has a first connection end and a second connection end,
   a lower end of the second connection end is connected to a bearing through a rotating shaft, and the bearing is provided in the reciprocating slot,
   a bottom of the driving plate is detachably connected to the brush head.

2. The reciprocating barbecue grill electric cleaning brush according to claim 1, wherein the guide rail comprises a first guide rail and a second guide rail, and the driving plate is provided with a first sliding port and a second sliding port corresponding to positions of the first guide rail and the second guide rail;
   the first sliding port is passed through the first guide rail, and the second sliding port is passed through the second guide rail;
   the first guide rail and the second guide rail are symmetrically arranged inside the cover.

3. The reciprocating barbecue grill electric cleaning brush according to claim 2, wherein the cover comprises a base and a shell cover,
   the first guide rail and the second guide rail are fixedly arranged on the base, and an avoidance groove is provided on the base;
   a bottom of the driving plate is provided with an insertion block, and the insertion block passes downward through the avoidance groove, and the brush head is provided with an insertion slot corresponding to a position of the insertion block.

4. The reciprocating barbecue grill electric cleaning brush according to claim 3, wherein the brush head comprises at least one main body and an action part, the insertion slot is provided on the main body, and the action part is provided on the main body.

5. The reciprocating barbecue grill electric cleaning brush according to claim 4, wherein the action part is one of a mesh cleaning net, a cleaning cloth, or a steel wire ball, wherein the mesh cleaning net has diamond shaped mesh holes.

6. The reciprocating barbecue grill electric cleaning brush according to claim 3, wherein one side of the cover is provided with a rolling mechanism, and the rolling mechanism comprises a rolling seat and a rolling wheel,
   wherein the rolling seat extends outward or downward from one side of the cover, and the rolling wheel is rotatably provided on one side of the rolling seat, and a bottom end of the rolling wheel is flushed with a bottom end of the brush head.

7. The reciprocating barbecue grill electric cleaning brush according to claim 6, wherein one side of the cover is further provided with a detachable scraper, and a bottom end of the scraper is flushed with the bottom end of the brush head.

8. The reciprocating barbecue grill electric cleaning brush according to claim 7, wherein one side of the cover is provided with an insertion seam, and an inner side of the insertion seam is provided with a flange;
   the scraper comprises a fixing part and a scraper part,
   wherein there is an obtuse angle between the fixing part and the scraper part, and one side of the fixing part is provided with a notch that fits with the flange and a blind end, and the blind end is in contact with a limit block inside the cover.

9. The reciprocating barbecue grill electric cleaning brush according to claim 1, wherein an upper end of the main engine is further provided with a blowing mechanism, and the blowing mechanism comprises a blowing motor, a fan, and an air duct;
   the fan is connected to an output end of the blowing motor, and the blowing motor and fan are sequentially arranged at the upper end of the main engine;
   the air duct comprises an air outlet and an air inlet, and a top of the main engine is provided with the air outlet;
   one side of the main engine is provided with the air inlet, and the air inlet and the air outlet are communicated to each other.

10. The reciprocating barbecue grill electric cleaning brush according to claim 9, wherein one side of the main engine is provided with a handle, the air inlet is provided at a bottom of the handle; and a switch, a control board, and a battery are further provided inside the handle.

11. The reciprocating barbecue grill electric cleaning brush according to claim 1, wherein the reciprocating slot is a track circular structure, and reciprocating slot comprises a rectangular area, a first arc-shaped bend, and a second arc-shaped bend,
   wherein the first arc-shaped bend and the second arc-shaped bend are provided on two sides of the rectangular area, and an outer circumferential arc surface of the bearing is inscribed with arc surfaces of the first arc-shaped bend and the second arc-shaped bend.

* * * * *